United States Patent [19]

Stakun et al.

[11] 4,212,540
[45] Jul. 15, 1980

[54] TESTING THE DIVERGENCE OF A BEAM FROM A LASER

[75] Inventors: Vitie J. Stakun, Pepperell; William H. White, Lexington, both of Mass.

[73] Assignee: RCA Corporation, New York, N.Y.

[21] Appl. No.: 964,540

[22] Filed: Nov. 29, 1978

[51] Int. Cl.² ............................................. G01B 9/02
[52] U.S. Cl. .................................................. 356/354
[58] Field of Search .............................. 356/354, 355

[56] References Cited

FOREIGN PATENT DOCUMENTS 575917   7/1978   U.S.S.R. ................................... 356/354

Primary Examiner—John K. Corbin
Assistant Examiner—Matthew W. Koren
Attorney, Agent, or Firm—Samuel Cohen; Carl V. Olson

[57] ABSTRACT

Apparatus to test the divergence of a beam from a laser includes a beam expander, aperture-forming means, an off-axis parabolic mirror positioned to image the beam from the aperture in a Fraunhofer plane, and a vidicon camera to translate the spatial distribution of light energy along a horizontal line in the Fraunhofer plane to an electrical signal indicating the difference between a light energy peak and a light energy valley. The aperture-forming means includes a V-shaped slit which is movable relative to a member with a horizontal slit so that the aperture formed can be changed from a single aperture to two apertures having an increasing separation. The amount of separation of the apertures when the electrical signal goes through zero is an inverse measure of the divergence of the light beam from the laser under test.

8 Claims, 6 Drawing Figures

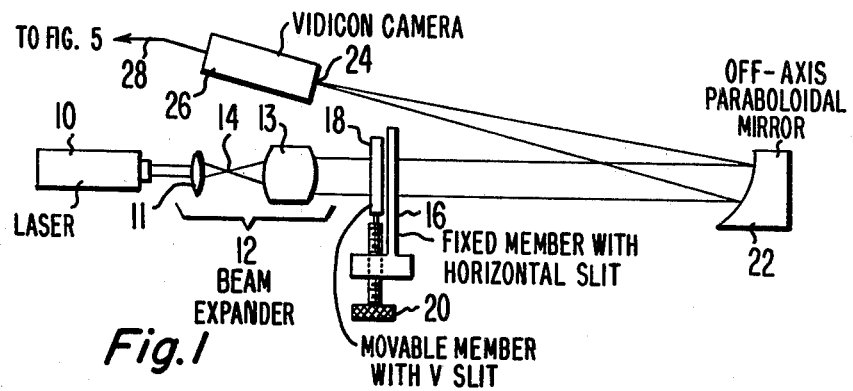
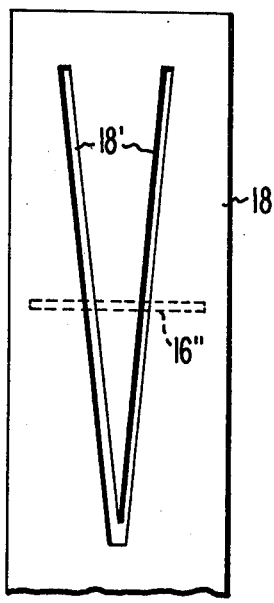
Fig.2
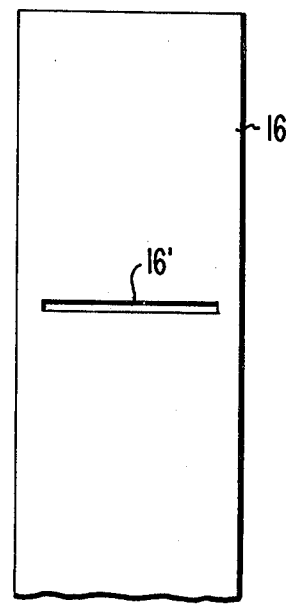
Fig.3
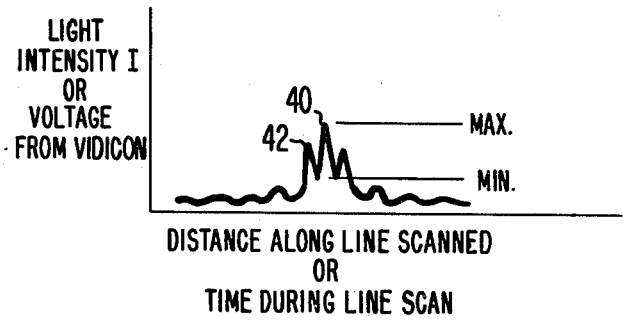
Fig.4

TESTING THE DIVERGENCE OF A BEAM FROM A LASER

The invention relates to apparatus for testing or measuring the divergence of a light beam from a laser.

A knowledge of the divergence of a laser is important for determining the suitability of the laser for use in a particular intended optical device. Existing apparatus for testing the divergence of a laser involves a test facility having a very long path such as 10 meters for the laser beam. The path must be protected from thermals, gradients, air movements, dust, etc. The laser must be precisely focused on and aligned with a pin hole aperture located at the end of the optical path. The long optical path also involves a significant danger that persons performing the tests may be injured by the laser beam.

According to an example of the present invention, an apparatus for testing the divergence of a laser occupies a relatively small space, does not require precise alignment of the laser, and includes a beam expander for the light from a laser under test, variable aperture means, means to image the aperture in a Fraunhofer plane, and opto-electronic transducer means to generate a signal to indicate the difference between a light peak and a light valley in the plane as the aperture is changed from a single spot to two increasingly-separated spots. The divergence of the laser is determined from the relationship of the signal and the separation of the spots.

In the drawing:

FIG. 1 is a diagram of equipment for testing the divergence of a light beam from a laser;

FIG. 2 is a front view of a movable member in FIG. 1 having a V-shaped slot;

FIG. 3 is a front view of a fixed member in FIG. 1 having a horizontal slot for use in cooperation with the movable member of FIG. 2;

FIG. 4 is a chart showing the variation of light intensity I along a line on the face of a vidicon camera in FIG. 1 when the member of FIG. 2 is adjusted to pass a single spot of light;

Figure 5:
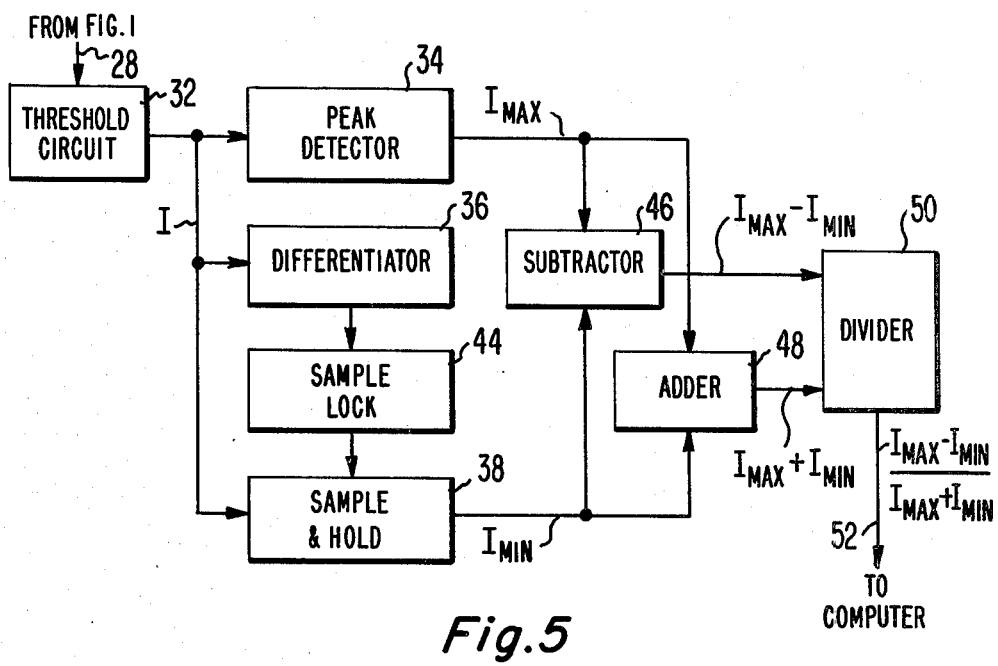
FIG. 5 is a block diagram of a circuit for translating the electrical output of the vidicon camera to an electrical signal indicating the difference between $I_{max}$ and $I_{min}$ in FIG. 4.

Reference is now made in greater detail to FIG. 1 for a description of an apparatus which has been used to test the divergence of the light beam from a helium-neon gas laser 10 after passing through a beam expander 12 including a microscope objective 11 and a 135 mm lens 13. Since the light from a gas laser is highly coherent, a spinning diffuser (not shown) may be placed at the expander lens primary focus 14 to insure a Gaussian-shaped intensity distribution of the light from the laser. The spinning diffuser may consist of a finely ground glass which is rotated at a speed sufficiently high in relation to the time to scan one field in the vidicon camera to be described. The laser 10 and beam expander 12 in combination represent the laser under test. After the divergence of the laser and beam expander in combination is determined, the divergence of the laser per se can be calculated by dividing the divergence of the laser and beam expander combination by the power of the beam expander. The laser under test may be a neodymium or ruby crystal laser unit having a built-in beam expander and having a Gaussian output beam. In this case, a spinning diffuser is not needed.

An aperture forming means, including a fixed member 16 having a horizontal slit 16' as shown in FIG. 3 and a movable member 18 having a V-shaped slit, 18' as shown in FIG. 3, is positioned in the path of the laser beam. The movable member 18 is movable by means of a micrometer screw 20 from a position in which the bottom of the V slit 18' is aligned with the horizontal slit 16' to form a single central aperture through which the laser light can pass. The movable member then can be moved downwardly so that the V slit and horizontal slit form two apertures which are increasingly separated. An intermediate position of the member 18 is shown in FIG. 2 relative to the position of the fixed horizontal slit 16'' shown by dashed lines. A maximum downward movement of member 18 results in a maximum separation of the two apertures formed by slits 16' and 18'.

Light passing through the aperture forming means 16, 18 is directed to an off-axis paraboloidal mirror 22 which focuses the light beam or beams at a Fraunhofer plane located at the face plate 24 of a vidicon tube of a vidicon camera 26. The mirror 22 may be replaced by a lens of equal focal length if a straight unfolded path for the light beam is desired from the laser to the vidicon camera. The vidicon camera may be a Model WV-241P Panasonic ® camera (used without a lens) sold by Matsushita Electric Corporation of America. The camera 26 is mounted so that a scan line on the face of the vidicon tube is aligned with the horizontal slit 16' of member 16. The variation in light intensity I along a central horizontal vidicon scan line is the result of optical interference and is as shown by the chart of FIG. 4 when a single central aperture is formed by members 16 and 18. The difference between $I_{max}$ and $I_{min}$ is then great, and it decreases as the V slit member 18 is moved to form two increasingly-separated apertures. As shown in FIG. 4, the electrical output at 28 of the vidicon camera during a scan line varies in the same way as the light intensity I varies on the face of the vidicon.

The vidicon camera 26 may be replaced by any other suitable type of opto-electronic transducer, such as can be provided by an array of photocells, for example.

The electrical output on line 28 of vidicon camera 26 is applied to a threshold circuit 32 in FIG. 5 which amplifies solely the upper portion of the voltage waveform shown in FIG. 4, and eliminates the variations before and after the main central portion of the waveform. The output I of circuit 32 is applied to a peak detector 34, a differentiator 36 and a sample-and-hold circuit 38. The peak detector produces a voltage corresponding with the light intensity $I_{max}$ at the top of peak 40. The differentiator 36 produces a voltage waveform having a positive peak on the rising edge of peak 42 in FIG. 4, followed by a negative peak on the falling edge of peak 42. This signal is applied to a sample lock circuit 44 to produce a pulse which causes the sample-and-hold circuit to take and store a voltage corresponding with the light intensity $I_{min}$ in the valley following peak 42.

The voltages corresponding with light intensities $I_{max}$ and $I_{min}$ are applied to a subtractor 46, and to an adder 48, from which the difference and sum signals are applied to a divider 50. The output of the divider at 52 is a signal representing the "visibility" V of the pattern of light intensity variations shown in FIG. 4. This signal is applied to a computer (not shown) programmed to compute the divergence $\theta$ of the laser 26, as will be described.

In the performance of a divergence test using the apparatus of FIG. 1, it is important that the light beam applied to the variable aperture means have a sufficient cross sectional diameter, such as at least 7 mm, to illuminate the two apertures when they are at their maximum separation. A crystal laser unit to be tested will normally include a built-in beam expander providing an output beam of sufficient cross section. If a laser to be tested does not include a beam expander, a beam expander should be inserted between the laser and the aperture means to provide the necessary beam diameter at the aperture means.

The movable member 18 of aperture means 16, 18 is initially adjusted upwardly by micrometer screw 20 so that the bottom point of V slit 18' is registered with the center of horizontal slit 16 and a single rectangular aperture is formed. The light beam passed through the aperture is focused or imaged by paraboloidal mirror 22 at the Fraunhofer plane 24 at the face of the vidicon camera 26. The light intensity along a scan line on the face of the vidicon camera will vary as shown in the chart of FIG. 4 with a light intensity peak $I_{max}$ and a light intensity valley $I_{min}$. The electrical voltage output of the vidicon varies in the same way as the light intensity as shown in FIG. 4. The electrical circuits compute the value of "visibility" V from the formula:

$$V = \frac{I_{max} - I_{min}}{I_{max} + I_{min}}$$

Figure 6:
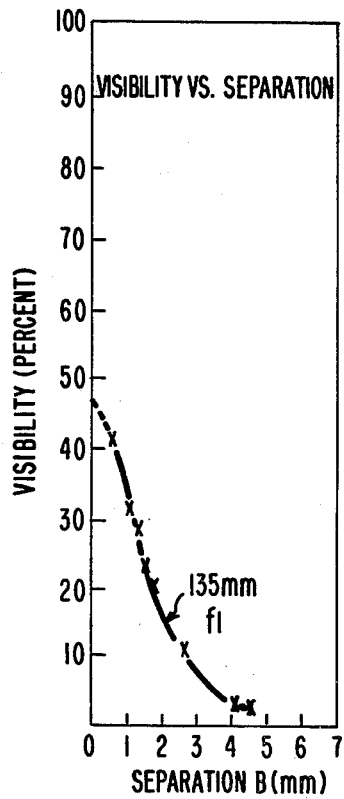
FIG. 6 is a chart showing how the difference between $I_{max}$ and $I_{min}$ varies with separation of two apertures formed by the members of FIGS. 2 and 3.

The resulting value of visibility V in an actual test was 47% when the aperture separation was zero, as shown by the highest point of the curve of FIG. 6.

Other points on the curve of FIG. 6 are then determined. The movable member 18 is moved down a small amount so that two apertures are formed having a known observed separation B and the value of visibility V is calculated and plotted. Additional points on the Gaussian curve are found until the visibility V reaches zero, which in the example of FIG. 6 occurred with an aperture separation B of about 5 or 6 mm.

The divergence $\theta$ of the laser 10 and beam expander 12 is equal to the 2 times the spot size radius X at the focal plane 14 of lens 13 divided by the focal length of the lens 13, which in the present example is 135 mm.

$\theta$ = spot size diameter at 14/focal length of lens 13

$$\theta = 2X/135 \tag{1}$$

The spot size radius X is given by the formula:

$$I(X) = I_0 \, EXP\left(\frac{-X^2}{2a^2}\right) \tag{2}$$

The value of $2a^2$ is obtained from the formula:

$$V = EXP - (2a^2 \pi^2 M^2 B^2/(f\lambda)^2) \tag{3}$$

The equation is easily solved for $2a^2$ by using the 1/e point on the Gaussian curve of FIG. 6. (The constant e is 2.7188). The visibility V at the 1/e point is 47% × 1/e = 47% × 0.3678 = 17.3%. (The 47% figure is the highest point on the curve of FIG. 6). The separation B at this value of visibility V is 1.9 mm. Equation (3) becomes simplified as follows:

$$2a^2 = \frac{1}{\pi^2 M^2 \left(\frac{B}{f\lambda}\right)^2} = 2.047 \times 10^{-4}$$

where M is the magnification factor and is equal to focal length of 22 divided by focal length of 13, or 1219 mm/135 mm = 9.029; B is the separation of 1.9 mm; f is the focal length of the off-axis paraboloidal mirror 22 and is 1219 mm; and $\lambda$ is the wavelength of the helium-neon laser 10 and is 0.6328 microns.

At the 1/e point, equation (2) simplifies to:

$$2a^2 = X^2 \tag{5}$$

X = radius of spot = 0.0143 mm

Substituting X into equation (1) gives the divergence $\theta$ of the laser 26 as follows:

$\theta = 0.0286/135 = 2.12 \times 10^{-4}$ radians.

$\theta = 212$ microradians.

What is claimed is:

1. Apparatus to test the divergence of a beam from a laser, comprising
  a beam expander receptive to the light beam from a laser under test,
  aperture-forming means providing an aperture in the path of the light from the beam expander,
  means to image the beam from the aperture in a Fraunhofer plane,
  an opto-electronic transducer positioned to translate the spatial distribution of light energy along a line in said Fraunhofer plane to an electrical signal indicating the difference between a light energy peak and a light energy valley, and
  means to alter said aperture-forming means to change the aperture to two apertures which are increasingly separated,
  whereby said electrical signal decreases with increasing separation of the apertures according to a function from which the divergence of the light beam from the laser under test can be calculated.

2. Apparatus according to claim 1 wherein said aperture-forming means comprises a member with a horizontal slit and a member with a V-shaped slit.

3. Apparatus according to claim 2 wherein said members are relatively movable from a position providing one aperture to positions providing two apertures with increasing separations.

4. Apparatus according to claim 1 wherein said means to image the beam includes an off-axis parabolic mirror.

5. Apparatus according to claim 1 wherein said opto-electronic transducer includes a vidicon camera.

6. Apparatus according to claim 5 wherein said opto-electronic transducer includes a peak-to-valley detecting circuit responsive to the electrical signal from said vidicon camera.

7. Apparatus to test the divergence of a beam from a laser, comprising
  a beam expander receptive to the light beam from a laser under test,
  means providing one rectangular aperture in the path of the light from the beam expander, said means including a member with a horizontal slit and a member with a V-shaped slit, the horizontal slit being registered with the bottom of the V-shaped slit, an off-axis parabolic mirror positioned to image the beam from the aperture in a Fraunhofer plane, an opto-electronic transducer positioned to translate the spatial distribution of light energy along a horizontal line in said Fraunhofer plane to an electrical signal indicating the difference between a light energy peak and a light energy valley, and means to move said member with a V-shaped slit downwardly, so that the single aperture becomes two apertures having an increasing separation, whereby said electrical signal decreases with increasing separation of the apertures according to a function from which the divergence of the light beam from the laser under test can be calculated.

8. Apparatus according to claim 7, and in addition, a spinning diffuser positioned between the laser and said aperture means.

* * * * *